United States Patent [19]
Ulich

[11] Patent Number: 5,231,480
[45] Date of Patent: Jul. 27, 1993

[54] AIRBORNE IMAGING LIDAR SYSTEM EMPLOYING TOWED RECEIVER OR TRANSMITTER

[75] Inventor: Bobby L. Ulich, Tucson, Ariz.

[73] Assignee: Kaman Aerospace Corporation, Bloomfield, Conn.

[21] Appl. No.: 614,670

[22] Filed: Oct. 24, 1990

[51] Int. Cl.⁵ .................. G01C 3/08; H04N 7/00
[52] U.S. Cl. .................................. 358/95; 356/5
[58] Field of Search ............... 358/95; 356/4, 5; 367/149, 130

[56] References Cited

U.S. PATENT DOCUMENTS

| | | | |
|---|---|---|---|
| 3,610,755 | 10/1971 | Wieberger | 356/4 |
| 3,669,540 | 6/1972 | Rattman et al. | 356/4 |
| 4,473,896 | 9/1984 | Loeser | 367/131 |
| 5,025,423 | 6/1991 | Earp | 367/137 |

Primary Examiner—Stephen C. Buczinski
Attorney, Agent, or Firm—Fishman, Dionne & Cantor

[57] ABSTRACT

An imaging lidar apparatus for detecting and imaging an object enveloped by a backscattering medium which is at least partially transmitting to light is presented. The imaging lidar apparatus is mounted on an airborne platform and including light pulse generating means, reflected light pulse detection means and computer control means. A discrete vehicle is towed by a cable connected to the airborne platform. The discrete vehicle houses optics for receiving or transmitting light pulses. Fiber optic communication may be used to transmit the light pulses along the cable between the airborne platform and the towed vehicle.

8 Claims, 6 Drawing Sheets

AIRBORNE IMAGING LIDAR SYSTEM EMPLOYING TOWED RECEIVER OR TRANSMITTER

CROSS-REFERENCE TO RELATED APPLICATION

This application is related to an application entitled "Imaging System Employing Bistatic Operation," Ser. No. 07/602,727 filed Oct. 24, 1990 by R. Norris Keeler and Bobby L. Ulich, now abandoned.

BACKGROUND OF THE INVENTION

This invention relates generally to a sensor system for remote detection and imaging of objects in a backscattering medium such as air or water. More particularly, this invention relates to a method and apparatus for detecting, locating and/or imaging underwater objects such as mines and submarines from an airborne platform using a novel imaging lidar (light detection and ranging) system which employs a method for improving the imaging of targets being viewed in reflection using bistatic operation of the imaging lidar system.

It is desirable in a number of military and civilian applications to search a volume within a backscattering medium for the presence of certain targets. For instance, moored or bottom mines deployed in ocean shipping lanes are a hazard to navigating ships used both for military and for commercial purposes. For other civilian applications such as law enforcement on the ocean, it is desirable to detect the presence of submerged fishing nets or drug-carrying containers used in smuggling contraband. In or near harbors and beaches, it is also desirable to detect submerged obstructions, cables, pipelines, barrels, oil drums, etc. In strictly military applications, anti-submarine warfare demands an effective means of detecting and locating submarines.

Presently, cumbersome and time consuming wire line devices must be used for detecting underwater targets from remote airborne locations. These devices are lowered into the water and of course, are easily subject to damage and loss. Also, wire line devices make target searching relatively slow and can only detect targets without providing visual imaging. An important and novel system for remote detection and imaging of objects underwater (or objects obscured by other backscattering media which are at least partially transmitting to light such as ice, snow, fog dust and smoke) from an airborne platform has been described in U.S. Pat. No. 4,862,257 and U.S. patent application Ser. No. 256,778 filed Oct. 12, 1988, now U.S. Pat. No. 5,013,917, both of which are assigned to the assignee hereof and incorporated herein by reference. The imaging lidar system of U.S. Pat. No. 4,862,257 utilizes a laser to generate short pulses of light with pulse widths on the order of nanoseconds. The laser light is expanded by optics and projected down toward the surface of the water and to an object or target. U.S. application Ser. No. 256,778 relates to an imaging lidar system intended for night vision.

Imaging lidar systems of the type described hereinabove are also disclosed in commonly assigned U.S. patent application Ser. No. 420,247 filed Oct. 12, 1989 (now U.S. Pat. No. 4,964,721), and U.S. patent application Ser. No. 364,860 filed Jun. 12, 1989 (now U.S. Pat. No. 4,967,270, both of which are incorporated herein by reference. USSN 420,247 relates to an imaging lidar system which controls camera gating based on input from the aircraft onboard altimeter and uses a computer to thereby adjust total time delay so as to automatically track changing platform altitude. USSN 364,860 relates to a lidar system employing a plurality of gated cameras which are individually triggered after preselected time delays to obtain multiple subimages laterally across a target image. These multiple subimages are then put together in a mosaic in a computer to provide a complete image of a target plane preferably using only a single light pulse.

USSN 565,631 filed Aug. 10, 1990 which is also assigned to the assignee hereof and fully incorporated herein by reference, relates to an airborne imaging lidar system which employs multiple pulsed laser transmitters, multiple gated and intensified array camera receivers, an optical scanner for increased field of regard, and a computer for system control, automatic target detection and display generation. USSN 565,631 provides a means for rapidly searching a large volume of the backscattering medium (e.g., water) for specified targets and improves upon prior art devices in performance as a result of having more energy in each laser pulse (due to simultaneous operation of multiple lasers) and a more sensitive detection system using multiple cameras. The several cameras may be utilized to image different range gates on a single laser pulse or several cameras can be gated on at the same time to provide independent pictures which can then be averaged to reduce the noise level and improve sensitivity. Both of these improvements result in higher signal-to-noise ratio and thus higher probability of detection or greater range of depth capability.

In accordance with the imaging lidar systems of the type described above, targets are detected by their contrast with the light scattered or reflected back from the surroundings. If the target falls within a gate, it will be seen as a bright spot if its reflectivity is greater than the surrounding water; and either indistinguishable or as a dark area if its reflectivity is equal to or less than the surrounding water. If a target is above the gate, obscuration occurs, and in this case, since the obscuration represents a limiting case (no photons received) the signal to noise ratio is determined by the intensity of the surrounding light backscattered from the water.

Airborne imaging lidar systems fielded to date have been monostatic. In other words, the system's transmitter (laser) and receiver (camera) optics are colocated and coaxial. In a monostatic lidar system, the light scattered back from the gated area returns along the same path as it started from the transmitter. This 180° backscatter occurs at a peak in amplitude, and thus represents a maximum which occurs in backscattered light. This is the optimum arrangement for objects viewed in obscuration. As described in "Marine Optics", N. G. Jerlov, Elsevier Oceanography Series 14, p. 34, Elsevier, New York (1976), this peak in backscattering is symmetric around 180°. The intensity of this backscattering can decrease an order of magnitude at deflections as small as +/− 10° from 180°. As a result, the monostatic imaging lidar systems of the prior art are not well suited for imaging a target when viewed in reflection.

SUMMARY OF THE INVENTION

The above-discussed and other problems and deficiencies of the prior art are overcome or alleviated by the imaging lidar system of the present invention which is adapted to decrease the backscattering at the receiver when a target is viewed in reflection and to increase the backscattered reflection when the target is viewed in obscuration by operating the airborne lidar imaging system bistatically in the former case, and monostatically in the latter case.

In accordance with a first embodiment of the present invention, a retractible prism and remote reflecting mirror are used to direct the laser transmitter beam downward. The reflecting mirror is offset so that there is a finite angle between the transmitter optical path and the path of the light reflected back into the CCD framing camera. The angle can be varied by moving the reflecting mirror along a track or rail with the appropriate adjustment to the mirror so that the transmitter beam is completely captured and directed downward to illuminate the area viewed by the camera.

In a second embodiment of the present invention, the camera is placed on runners and displaced from the transmitter beam. A control is inserted so that the transmitter optics are directed to the area imaged by the camera.

In addition, two variations of these two embodiments are provided in which first, the camera optics move in response to the movement of the transmitter beam, and second, the camera optic are directed to view the area illuminated by the laser transmitter as the camera moves away from the location of the transmitter. In all of these preferred embodiments, the platform for the transmitter (and/or receiver) is an airborne system.

Still other embodiments of this invention are presented wherein a discrete vehicle towed by a cable is used to achieve bistatic imaging.

In several of the above-described embodiments, fiber optic communication may be utilized to achieve the required bistatic viewing angles.

The present invention is particularly useful in imaging targets which can be observed in reflection or in obscuration and for which it would be desirable to maximize the ambient backscatter (target in obscuration), or on the other hand, minimize the ambient backscatter (target in reflection). Of course, multiple cameras can be employed so that simultaneous monostatic and bistatic operation can be achieved, providing optimized detection in both reflection and obscuration modes.

The above-discussed and other features and advantages of the present invention will be appreciated and understood by those of ordinary skill in the art from the following detailed description and drawings:

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
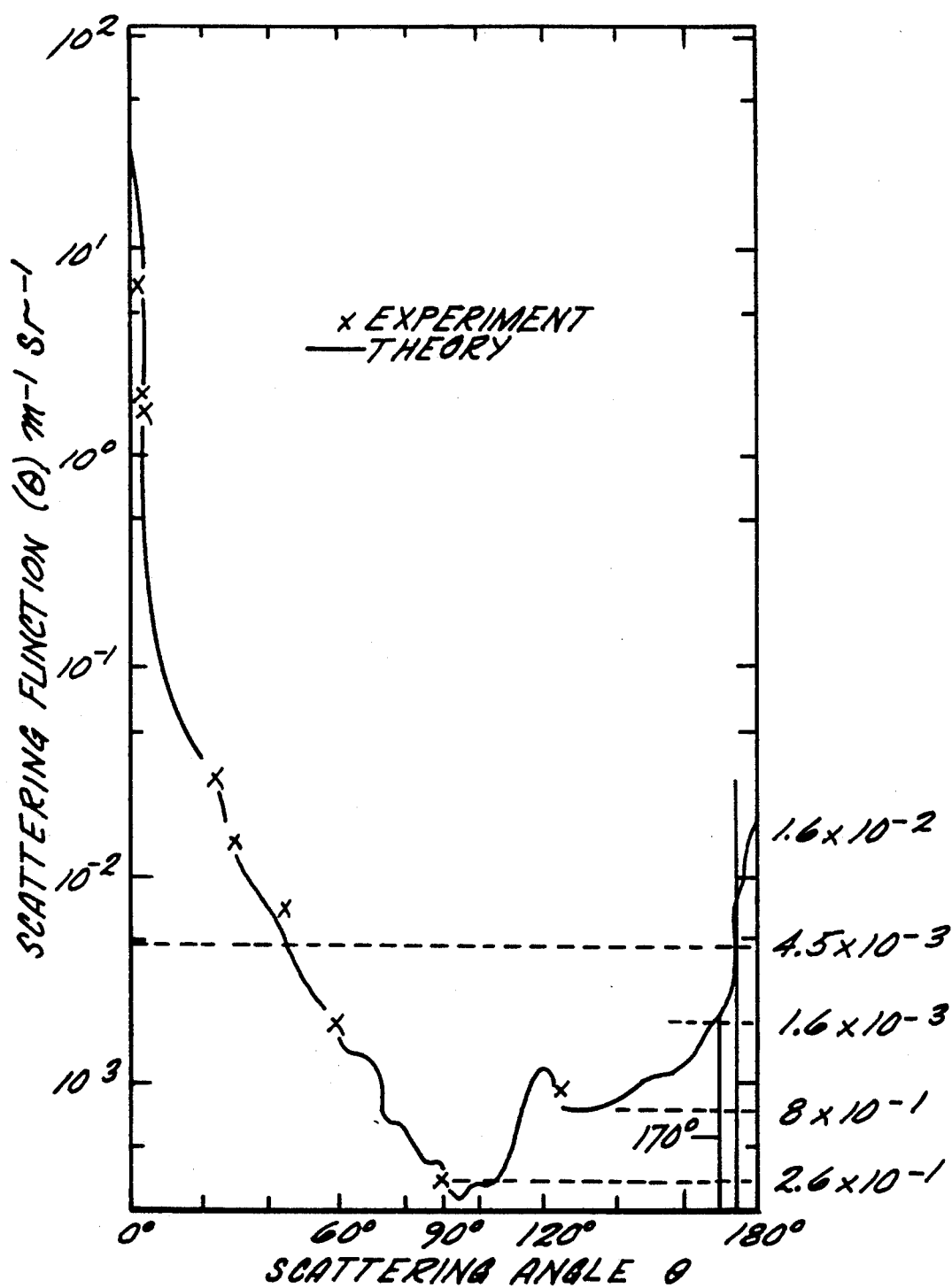
FIG. 1 is a graph depicting the amplitude of volume backscatter as a function of scattering angle.

Referring first to FIG. 1, and in accordance with the present invention, it is shown that to decrease the backscatter by a factor of ten (one order of magnitude) for observation of a target in reflection, the transmitter (e.g., lasers) and receiver (e.g. camera) must be in the bistatic mode with path separations in the water of 10°. For a decrease of a factor of twenty, a path separation of 40° is required. Although theoretically a decrease of close to two orders of magnitude could be obtained with a 90° angle, this would present practical difficulties. In addition to the maximum shown in FIG. 1, additional effects can also be represent over angles close to 180°, but the presence of such effects does not alter the qualitative performance of the present invention.

Figure 2A:
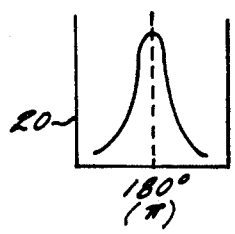
FIGS. 2A and 2B are graphical representations showing backscattered light for a single pulse in respective monostatic and bistatic lidar systems.
Figure 2B:
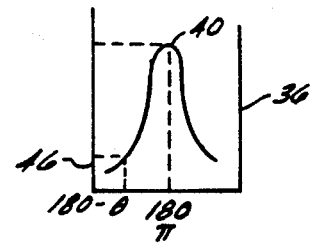
Figures 3A, 3B:
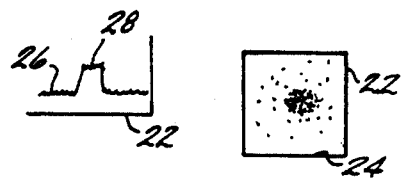
FIGS. 3A through 3D are graphical representations showing backscattered light for a target in reflection for monostatic and bistatic lidar systems, respectively.
Figure 4A:
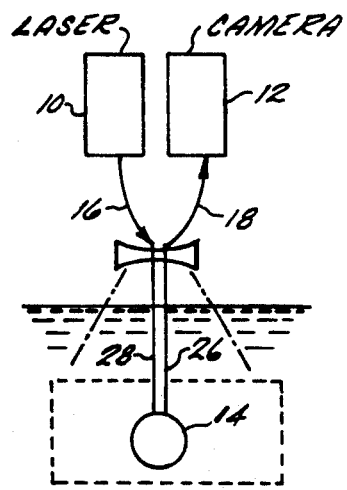
FIGS. 4A and 4B are schematic diagrams of monostatic and bistatic imaging lidar systems, respectively.
Figure 4B:
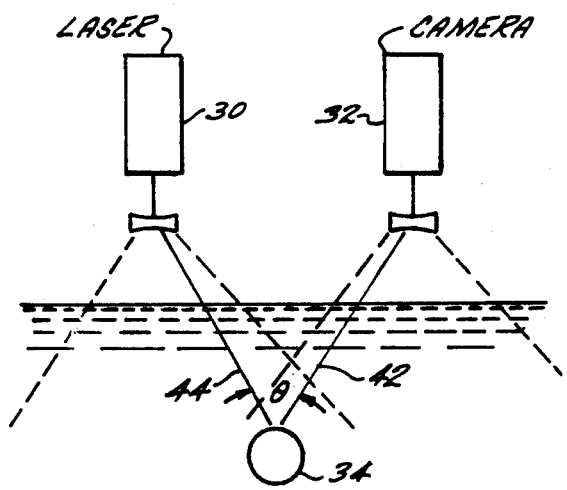
Figure 5A:
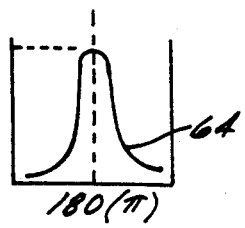
FIGS. 5A and 5B are graphical representations showing backscattered light for a single pulse in obscuration for monostatic and bistatic lidar systems, respectively.
Figure 5B:
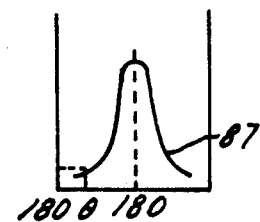
Figures 6A, 6B:
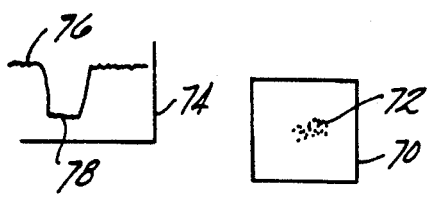
FIGS. 6A through 6D are graphical representations of the target signatures of FIGS. 5A and 5B, respectively, shown on a video frame.
Figures 6C, 6D:
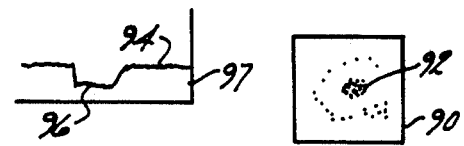
Figure 7A:
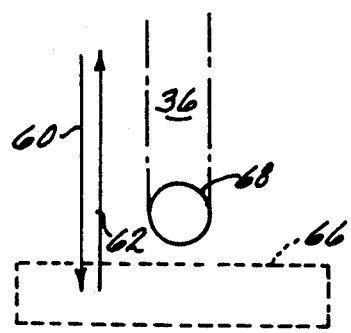
FIGS. 7A and 7B are schematic diagrams depicting the light paths for the respective targets of FIGS. 5A and 5B.
Figure 7B:
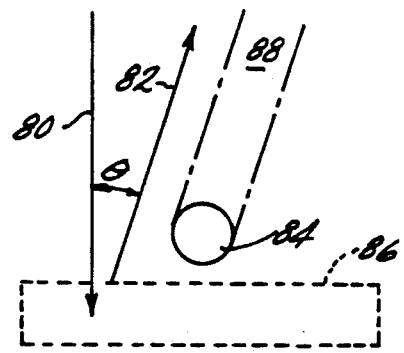

Referring to FIGS. 2A-B, 3A-B and 4A-B, the effects of separating the transmitter and receiver are shown wherein two lidar systems are seen operating side by side in a monostatic mode (FIGS. 2A, 3A and 4A) and a bistatic mode (FIGS. 2B, 3B and 4B). In FIGS. 2A, 3A and 4A, the lidar system with pulsed laser transmitter 10 and gated intensified charge coupled device (ICCD) camera 12 (FIG. 4A) is illuminating and viewing a target 14 underneath the ocean surface. The illuminating light 16 and returned light 18 are coaxial; that is, the scattering angle of the returned light is 180° (with respect to the Zenith direction). FIG. 2A is a graph 20 taken from FIG. 1, showing that the light backscattered from the ocean surrounding the target is at a maximum, and this is reflected in trace 22 across one of the video frames 24 (see FIG. 3A) from the illumination of target 14 by a single pulse. The trace 22 taken across this video frame 24 shows a level of "noise" 26 representing return from the sea water, and a "signal" 28 representing return from the target.

Referring now to FIGS. 2B, 3B and 4B, the bistatic system consists of a separately located laser transmitter 30 and camera 32. A target 34 is shown at the same depth and is physically identical to target 14. The effect of the separation of camera 32 and laser transmitter 30 is shown in the graph 36 (FIG. 2B). Light 38 scattered back from the illuminated area toward the transmitting laser is at the same intensity as the light received at the camera of the monostatic system, and this is shown as point 40 on graph 36. However, the light received at the bistatic camera returning along path 42 at an angle θ from the path 44 of the light transmitted downward is of lower intensity, as represented by the point 46 on graph 36. A trace 48 across the video frame 50 corresponding to this situation (FIG. 3B) shows a decreased "noise" level 52 and a "signal" 54 which is comparable to the signal 28 which was coaxial with the illuminating light beam in the monostatic case (see FIG. 3A). The reason that signals 54 and 28 are roughly equal in magnitude is that the target is a diffuse lambertian reflector. If the target had been a specular reflector of high reflectivity (e.g., a mirror) directed back at the transmitters 10 and 30, the signal 28 would have been relatively intense, but the signal 54 would have been negligible. Note also that in accordance with this invention, the bistatic system (FIG. 4B) can be configured so that the laser transmitter 30 illuminates the same volume viewed by the camera 32 (as best shown in FIG. 9).

Referring to FIGS. 5A-B, 6A-B and 7A-B, a comparison between the monostatic (FIGS. 5A, 6A and 7A) and bistatic (FIGS. 5B, 6B and 7B) imaging of targets in obscuration is shown. In the case of monostatic operation, the transmitted light 60 and backscattered light 62 are coaxial; that is, the light 62 returns to the camera along the same path that the pulsed illuminating light 60 arrived. Thus, the scattering angle is 180°. This is the point for maximum scattering return from the ocean as shown by the graph 64 in FIG. 5A. The ICCD camera gate is timed to observe the volume 66 which is below the object 68 to be observed. Thus, the object 68 is seen in obscuration, since all light which would have returned from the imaged area 66 to the camera, and passing through the target will be blocked or obscured. This appears on the video screen 70 as a dark spot 72 which is highlighted by the surrounding backscatter originating from that part of 66 not obscured by the target above it. The trace 74 is plotted showing the surrounding "noise" 76 and signal 78. In this instance, contrast is provided by the value of the surrounding backscattered light, so that in this case the noise becomes the signal and the signal is merely the absence of noise. For the bistatic case, (FIGS. 5B, 6B and 7B), the backscatter available to provide contrast with the absence of signal from the obscured region is reduced thereby decreasing the effective "signal" to "noise" ratio. In this bistatic case, the pulsed laser illumination 80 illuminates the area imaged by the ICCD camera, The light returns at 82 to the camera which is now no longer coaxial with the pulsed laser transmitter. The angular separation of the light rays is $\theta$. The light which would have returned to the camera through the space now occupied by the target 87 is obscured. An obscuration volume 86 results similar to 66 in the monostatic case. As can be seen from referring to graph 86, the intensity of the backscatter is reduced, providing lesser contrast with the shadow area caused by the obscuration 88. This can be seen on the video frame 90. A scan 97 across this frame shows the ambient backscatter 94 decreased, while the signal level 96 which is associated with the target obscuration remains relatively constant, roughly equivalent to 78.

Figure 8:
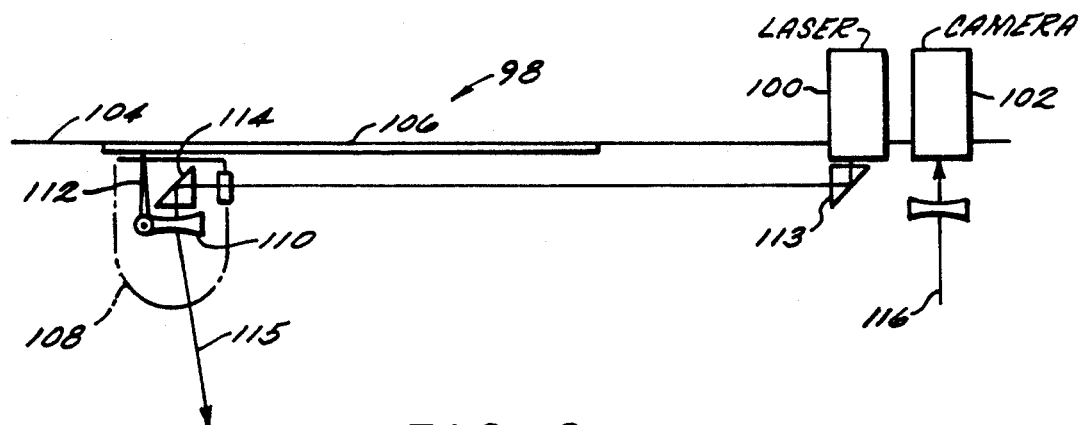
FIG. 8 is a schematic diagram of an imaging lidar system capable of both monostatic and bistatic operation.

Referring to FIG. 8, a first preferred embodiment for achieving bistatic configuration for an imaging lidar system is shown generally at 98 wherein the transmitter and receiver are mounted for monostatic (coaxial) sensing; with the addition of a movable mirror to alter the trajectory of the pulsed light rays from the transmitter. The pulsed laser transmitter 100 and ICCD camera 102 are mounted on an aircraft airframe 104. A rail 106 is provided for a housing 108 of a turning prism and output beam steering optics 110 (e.g. mirror) so that the location of the effective origin of the output pulse can be varied. A control coupling 112 for the output optics is provided with input from the aircraft altimeter, so that the pulsed laser transmitter can continue to illuminate the volume of the ocean viewed by the ICCD camera, as altitude and distance between transmitter and receiver are varied (see U.S. patent application Ser. No. 420,247 which has been incorporated herein by reference). The transmitted light pulses are initially directed away from a 180° degree trajectory by a first prism 113 and then directed to beam steering optics 110 by a second prism 114. The redirected output beam 115 is transmitted downwardly and returns to the camera 102 as the backscattered pulse 116. Of course, housing 108 is movable and steering optic 110 is pivotable to alter the trajectory of the transmitted pulsed light as desired. Moreover, the mirror 113 may be removed or disengaged to permit conventional coaxial (monostatic) operation.

Figure 9:
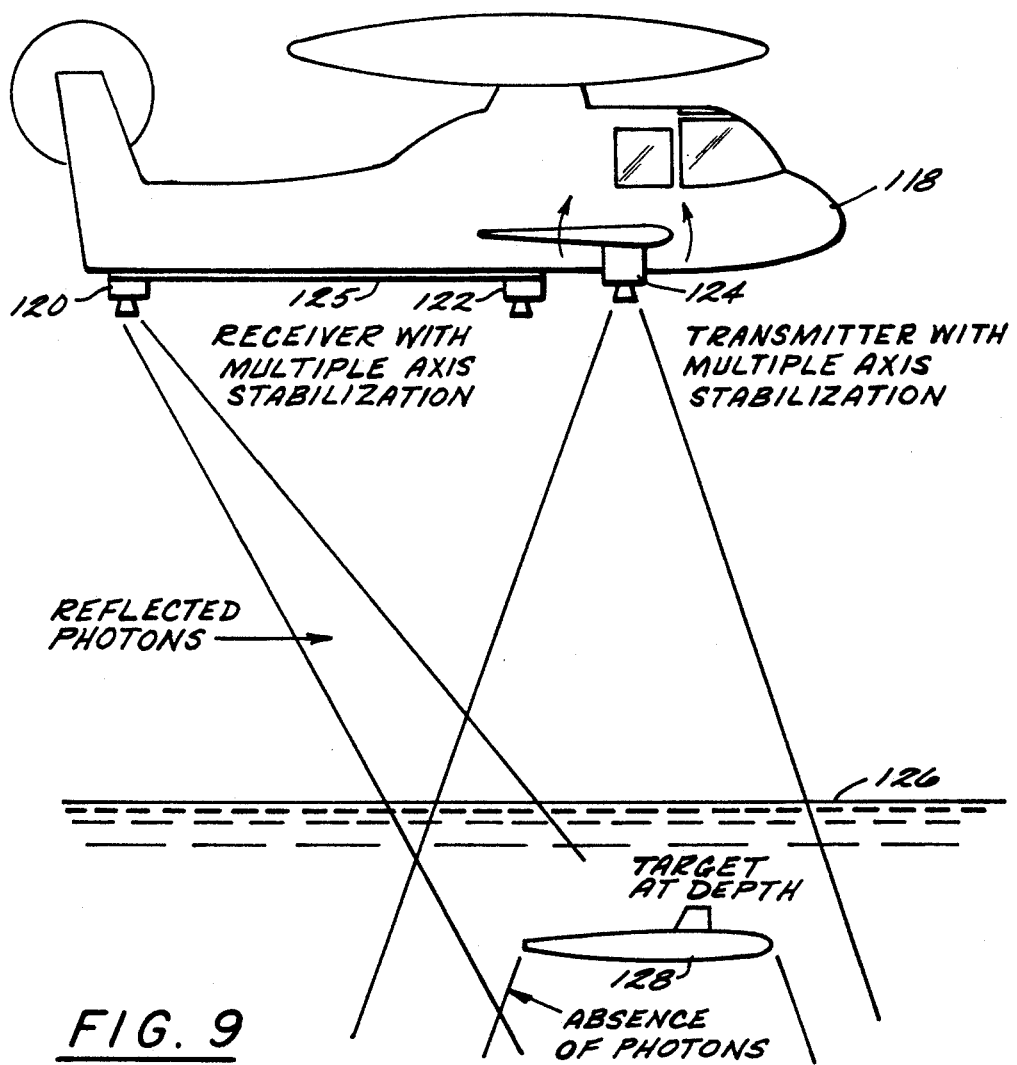
FIG. 9 is a diagrammatic view of an alternative embodiment of the imaging lidar system of the present invention installed on a helicopter.

Turning now to FIG. 9, alternative arrangements for both bistatic and monostatic imaging lidars are shown mounted on a helicopter 118. In a first of these embodiments, a pair of spaced receivers 120 and 122 are used in conjunction with a transmitter 124 wherein receiver 120 is used in a bistatic mode and receiver 122 is used in a monostatic mode. As discussed in detail above, the bistatic arrangement may be useful for detecting targets in reflection. In this configuration the camera 120 is physically separated in the horizontal plane from the laser beam projection optics 124 and their relative lines of sight are tilted to intersect at the target search depth. In this case, the volume backscatter angle is not 180° (with respect to the zenith direction) but is less than 180°. The result will be appreciably reduced backscatter light levels from the water 126 volume but no reduction in the target 128 reflection intensity. Thus, the SNR will be improved by avoiding the strong peaking of light backscatter at 180°. As also mentioned, for shadow detection, the coaxial mode (180°), and hence camera 122, are preferred since this gives the highest SNR for that mode. Thus, the system of FIG. 9 employs two sets of cameras 120, 122, one camera (e.g., 122) near the laser for optimized shadow detection and one camera (e.g., 120) separated for optimum reflection detection. Also, and for increased flexibility, camera 120 may be mounted on rails or rollers 125 so that it will be movable in the horizontal direction and the distance between transmitter 124 and camera 120 may be easily varied. In still another alternative embodiment, camera 122 may be removed and only movable camera 120 used. Camera 120 would then be movable between a first position coaxial with transmitter 124 (monostatic) and a plurality of second positions horizontally displaced from transmitter 124 (bistatic).

Figures 3C, 3D:

In addition, the transmitter 124 and receivers 120, 122 are compensated in the three aircraft axes for roll, pitch and yaw during flight, thereby maintaining a constant, boresighted angular relationship between the transmitter, receiver and the target area of interest. This method will compensate for changes in aircraft flight conditions as well as for external factors such as wind gusts. A preferred compensating system is disclosed in FIG. 3 of USSN 565,631 (which has been incorporated herein by reference).

Figure 10:
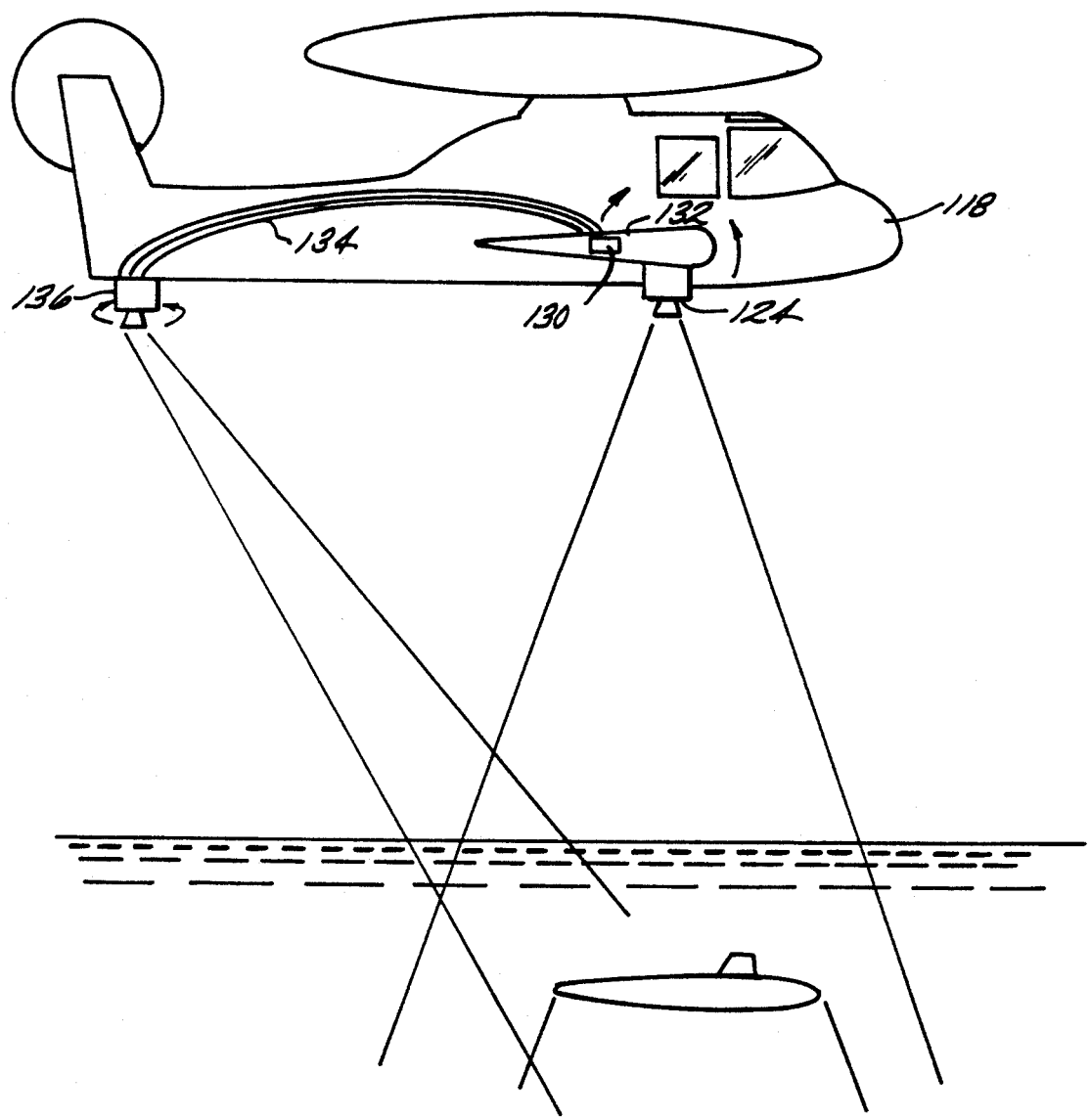
FIG. 10 is a diagrammatic view of still another embodiment of this invention which employs fiber optic communication.

In still another alternative embodiment shown in FIG. 10, the electronics 130 for the gated camera are mounted near the laser transmitter 124 in the lidar system housing 132. When bistatic viewing is desired, a bundle of optical fibers 134 terminating at horizontally displaced receiving optics 136 is used to transmit received pulses of light to the lidar system camera sensor for detection. Of course, fiber optics may also be used conversely. In this latter case, element 136 comprises a projector; element 130 comprises the laser transmitter and element 124 comprises the receiver. Thus, the transmitter 130 will transmit pulses of light along at least one optical fiber 134 for projection downwardly through projection optics 136. Reflected pulses will then be received by receiver 124.

Figure 11:
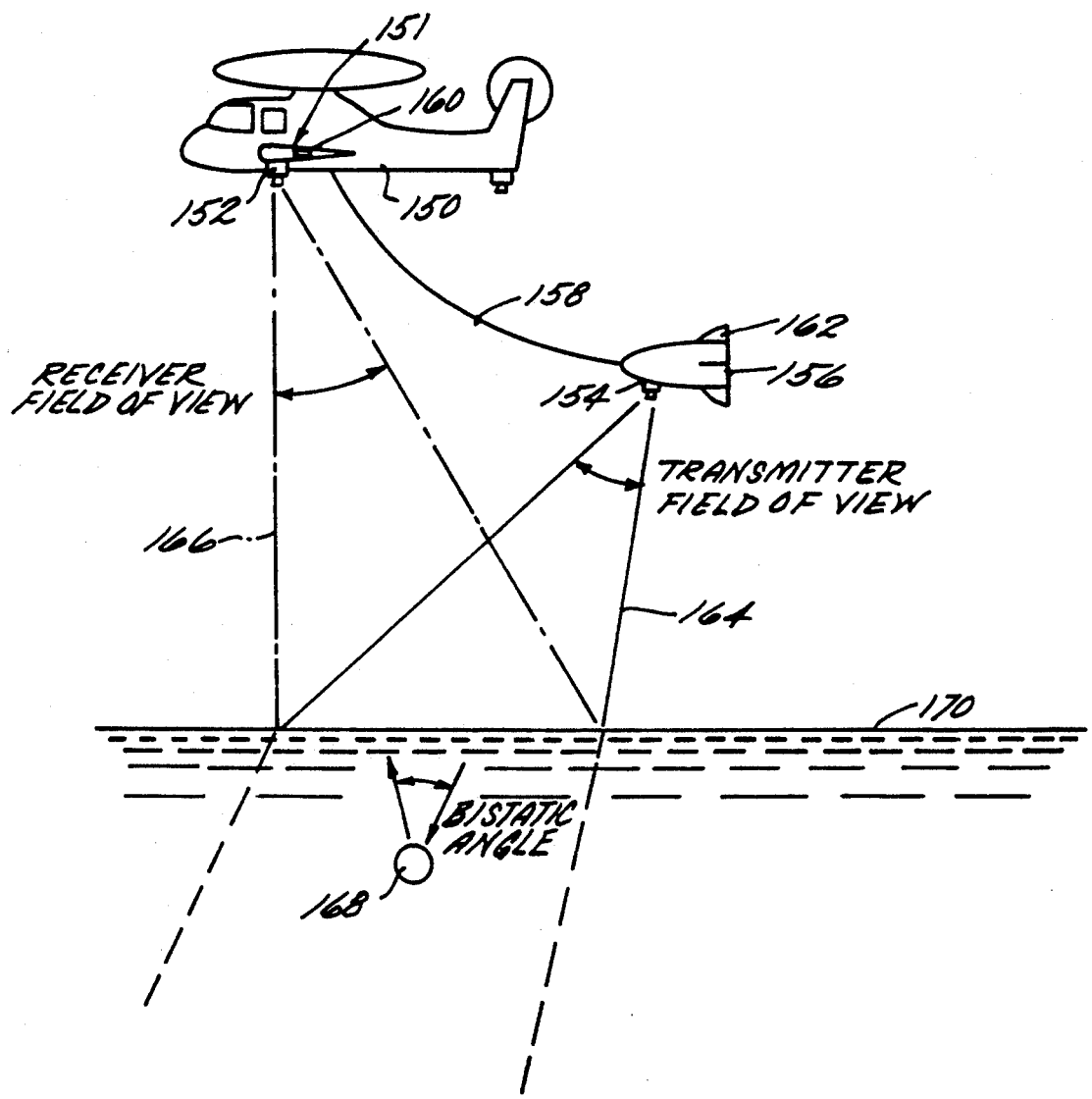
FIG. 11 is a diagrammatic view of yet another embodiment of this invention which employs a discrete vehicle towed by a cable.

Referring now to FIG. 11, still two additional embodiments of the present invention are schematically shown. In a first of these additional embodiments, the airborne platform 150 (i.e., helicopter) includes a lidar system 151 having gated camera receiver 152 conventionally positioned for 180 degree viewing. In accordance with the present invention, the pulsed laser projector 154 is displaced horizontally from receiver 152 which is housed in a discrete vehicle 156 pulled along by platform 150 using a suitable cable 158. Vehicle 156 may be towed by platform 150 through the air or under water 170. Preferably, the pulsed laser transmitter 160 is actually housed in lidar system 151 with an optical fiber running along cable 158 so as to optically interconnect transmitter 160 to projector 154. Fins 162 are provided on vehicle 156 for stabilization purposes. As is clear from a review of FIG. 11, the towed transmitter vehicle 166 will provide a field of view 164 which is angled (when compared to the field of view 166 provided by receiver 152) so as to result in the lidar system 151 viewing the target 168 (under water 170) at a bistatic angle.

In a second embodiment of these alternative embodiments, element 152 comprises a pulsed laser transmitter and element 160 comprises the gated camera electronics with a bundle of optical fibers running along cable 158 to receiving optics 154 on towed vehicle 156.

In still other variations of the embodiments of FIG. 11, the actual pulsed laser transmitter or gated camera receiver may be housed in the towed vehicle 156 (thus, element 154 would function either as a transmitter or receiver). Communication between computer control means in the lidar system 151 on airborne platform 150 and either of the transmitter 154 or receiver 154 on vehicle 156 may be accomplished by any known hard-wired technique (e.g., along towing cable 158) or wireless technique (e.g., radio waves).

It will be appreciated that the imaging lidar systems depicted in FIG. 11 are novel not only in providing a means of accomplishing bistatic operation; but also in their overall configuration wherein either the transmitter means or receiver means are housed in a discrete vehicle towed by the airborne platform and wherein optical fibers may be used to optically interconnect the lidar system 151 to devices housed in vehicle 156.

It will be appreciated that a lidar imaging system that has been described above has been described with improved ability to image undersea targets, and provide a better signal to noise ratio and probability of detection. Of course, any desired imaging lidar system may be employed including systems incorporating multiple lasers, multiple cameras, etc.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An imaging lidar apparatus for detecting and imaging an object enveloped by a backscattering medium which is at least partially transmitting to light, the imaging lidar apparatus being mounted on an airborne platform and including light pulse generating means for generating pulses of light toward a target, gated light pulse detection means for detecting pulses of light reflected form the target and image display means for displaying an image of the detected target, and further including:

a discrete vehicle for housing projecting means for projecting pulses of light generated by said light pulse generating means; and cable means for attaching the vehicle to the airborne platform and towing the vehicle through the air or water, said cable means including fiber optic means for optically transmitting the pulses of light form said light pulse generating means to said projecting means.

2. The apparatus of claim 1 wherein:

said pulses of light are projected by said projecting means toward a target at an angle of less than 180° with respect to said airborne platform.

3. An imaging lidar apparatus for detecting and imaging an object enveloped by a backscattering medium which is at least partially transmitting to light, the imaging lidar apparatus being mounted on an airborne platform and including light pulse generating means for generating pulses of light toward a target, gated light pulse detection means for detecting pulses of light reflected form the target and image display means for displaying an image of the detected target, and further including:

a discrete vehicle for housing receiving optics for initially receiving reflected light pulses; and cable means for attaching the vehicle to the platform and towing the vehicle through the air or water, said cable means including fiber optic means for optically transmitting the pulses of light received form the receiving optics to said gated light pulse detection means.

4. The apparatus of claim 3 wherein:

said pulses of light are projected by said projecting means toward a target at an angle of less than 180° with respect to said airborne platform.

5. An imaging lidar apparatus for detecting and imaging an object enveloped by a backscattering medium which is at least partially transmitting to light, the imaging lidar apparatus being mounted on an airborne platform and including light pulse generating means, reflected light pulse detection means, image display means for displaying an image of a target detected by the detection means and computer control means and further including:

a discrete vehicle for housing said light pulse generating means;

cable means for attaching the vehicle to the airborne platform and towing the vehicle through the air or water; and means for transmitting signals between said light pulse generating means and said computer control means.

6. The apparatus of claim 5 wherein said light pulse generating means includes projecting means and wherein:

pulses of light generated by said light pulse generating means are projected by said projecting means toward a target at an angle of less than 180° with respect to said airborne platform.

7. An imaging lidar apparatus for detecting and imaging an object enveloped by a backscattering medium which is at least partially transmitting to light, the imaging lidar apparatus being mounted on an airborne platform and including light pulse generating means, reflected light pulse detection means and computer control means and further including:

discrete vehicle for housing said light pulse detection means;

cable means for attaching the vehicle to the airborne platform and towing the vehicle through the air or water; and means for transmitting signals between said light pulse detection means and said computer control means.

8. The apparatus of claim 7 wherein:

said pulses of light are projected by said projecting means at an angle of less than 180° toward an object.

* * * * *